Patented Feb. 4, 1936

2,029,351

UNITED STATES PATENT OFFICE 2,029,351

DYEING PROCESS

Alec Wormald, Blackley, England, assignor to Imperial Chemical Industries Limited, a corporation of Great Britain No Drawing. Application June 20, 1934, Serial No. 731,571. In Great Britain June 26, 1933

4 Claims. (Cl. 8—6)

Hitherto it has been proposed to use solution salt as an assistant in applying sulfuric ester salts of leuco vat dyestuffs to textiles. Solution salt B consists essentially of the sodium salt of monobenzylsulfanilic acid, but as technically prepared, it sometimes contains a small proportion of dibenzylsulfanilic acid. I have now found dibenzylsulfanilic acid is a better assistant than monobenzylsulfanilic acid in the application of the said sulfuric ester salts.

Hereafter in this specification when I speak of dibenzylsulfanilic acid I do not include the dibenzylsulfanilic acid which is ordinarily present in monobenzylsulfanilic acid.

The present invention consists in a process for the application of sulfuric ester salts of leuco vat dyestuffs to textiles, which comprises the addition to the ester salts of a compound of the general formula

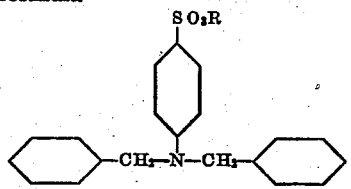

where R stands for hydrogen, sodium, potassium, ammonium or other substituent conferring solubility in water. It also comprises the application of the said compounds in solution in a polyhydric alcohol. Application may be by any of the usual methods, including printing, dyeing, padding and stencilling.

Generally the use of dibenzylsulfanilic acid improves the solubility of the sulfuric ester salt: it gives printing pastes with better working properties, and enables prints and dyeings to be obtained in deeper shades. These advantages show most with those sulfuric ester salts of low solubility, particularly with Indigosol brown IRRD, (Schultz, Farbstofftabellen, 7th edit., vol 1, page 132) pink IR extra (Supplement to the Colour index, page 43) and red violet IRH, (Schultz, page 133), and Soledom brilliant purple RR (Supplement, page 52).

Dibenzylsulfanilic acid is prepared as follows:— 173 parts of sulfanilic acid, 1000 parts of water, 480 parts of aqueous caustic soda liquor (33%) and 317 parts of benzyl chloride are stirred at 30–35° C. for 48 hours. The excess caustic soda is neutralized with concentrated hydrochloric acid and then a further 80 parts of hydrochloric acid added; the precipitated dibenzylsulfanilic acid is filtered off and washed free from benzyl chloride with hot water. The sodium salt is formed by dissolving the acid in water containing the theoretical amount of sodium hydroxide and then either allowing to crystallize out or evaporating to dryness.

The following examples in which parts are by weight illustrate but do not limit the invention.

*Example 1.*—The following printing paste is made up:—

| | Parts |
|---|---|
| Indigosol brown IRRD | 4 |
| Sodium salt of dibenzylsulfanilic acid | 5 |
| Hot water | 31 |
| Neutral starch tragacanth thickening | 60 |
| | 100 |

White cotton cloth is printed with this paste, dried, aged for 5 minutes in a rapid ager if desired, and developed by passing at 35° C. through a bath containing 20–30 parts of sodium bichromate and 60–80 parts sulfuric acid (168° Tw.) per 1000 parts of water, washed and soap-boiled.

*Example 2.*—The following printing paste is made up:—

| | Parts |
|---|---|
| Indigosol pink IR, extra | 4 |
| Sodium salt of dibenzylsulfanilic acid | 5 |
| Diethylene glycol | 10 |
| Hot water | 15 |
| Neutral starch tragacanth thickening | 60 |
| Sodium nitrite 30% solution | 6 |
| | 100 |

The paste is printed on white cotton cloth, dried, developed by passing at 70° C. through a bath containing 35 parts of sulfuric acid (168° Tw.) per 1000 parts of water, washed and soap-boiled.

*Example 3.*—The following printing paste is made up:—

| | Parts |
|---|---|
| Indigosol brilliant pink I3B | 6 |
| Sodium salt of dibenzylsulfanilic acid | 5 |
| Diethylene glycol | 10 |
| Hot water | 18 |
| Neutral starch tragacanth thickening | 55 |
| Sodium nitrile 30% solution | 6 |
| | 100 |

The print is dried, aged 5 minutes and developed as in Example 2.

*Example 4.*—10 lb. of 3:3'-dichlorodianthrahydroquinoneazinetetrasulfuric acid ester potassium salt (U. S. application Serial No. 433,498) and 10 lb. of the sodium salt of dibenzylsulfanilic acid are dissolved in 9 gal. of hot water containing 1 gal. of an 8% solution of gum tragacanth. This solution is cooled to 20° C. and 1½ pints of a 20% solution of sodium nitrite are added.

Cotton cloth is passed through this solution squeezed between rollers and dried. After drying, the cotton is treated for 3 minutes at 50° C. in a bath containing 1 gal. of sulfuric acid 160° Tw. to 100 gal. of water.

The cotton is then rinsed thoroughly, boiled in 1% soap solution, rinsed and dried.

*Example 5.*—A padding solution containing 6 lb. of Indigosol brown IRRD powder, 6 lb. of the sodium salt of dibenzylsulfanilic acid, 8 gal., of hot water, ¾ gal. of an 8% solution of gum tragacanth and 2 gal. of a 7.5% solution of sodium nitrite is prepared as in Example 4.

Cotton cloth is passed through this solution, squeezed between rollers and dried. After drying it is treated for 3 minutes at 50° C. in a bath containing 20 lb. of sulfuric acid (160° Tw.) per 100 gal. of water.

The cotton is then rinsed thoroughly, boiled in 1% soap solution, rinsed and dried.

*Example 6.*—20 lb. of the sulfuric acid ester of leuco dichloroisodibenzanthrone paste (Soledon brilliant purple RR) and 20 lb. of the sodium salt of dibenzylsulfanilic acid are dissolved in hot water and diluted to 200 gal. with water containing 100 lb. of common salt and the temperature then adjusted to 50° C.

100 lb. of cotton cloth are entered into the dye-bath at 50° C. and turned for 45 minutes, then removed, squeezed and entered into a developing bath containing 7 lb. of sulfuric acid (160° Tw.) and ½ lb. of sodium nitrite in 100 gal. of water.

The cotton is worked cold in this bath for 5 minutes, removed, rinsed thoroughly, boiled in a 1% soap solution, rinsed and dried.

*Example 7.*—A dye bath is prepared by dissolving 10 lb. of Indigosol brown IRRD powder, and 10 lb. of the sodium salt of dibenzylsulfanilic acid in hot water and diluting to 200 gal. with water containing 60 lb. of sodium sulfate (anhydrous) and 10 lb. of sodium nitrite.

The cotton is worked in this dye bath at 70° C. for half hour, lifted, squeezed, and transferred without rinsing to a bath containing 20 lb. of sulfuric acid, 160° Tw., per 100 gal. of water at 50° C.

The cotton is worked in this bath for 3 minutes, removed, rinsed thoroughly, boiled in 1% soap solution, rinsed and dried.

*Example 8.*—6½ oz. of Indigosol pink IR, extra powder, 8 oz. of the sodium salt of dibenzylsulfanilic acid and 1 pint of diethylene glycol are dissolved in 3 pints of hot water and 4 pints of thickening are added. After cooling a ½ pint of a 30% aqueous solution of sodium nitrite is added.

This paste is applied to the cotton fabric by brush stencilling and the stencilled and dried material is aged for 5 minutes in the rapid ager if desired, then passed through a bath containing 3½ lb. of sulfuric acid (168° Tw.) to 10 gal., of water at 65° C., washed and boiled in 1% soap solution.

*Example 9.*—8 oz. Indigosol brown IRRD powder, 8 oz. of the sodium salt of dibenzylsulfanilic acid and 16 oz. of diethylene glycol are dissolved in 3 pints of hot water and 3 pints of an 8% solution of gum tragacanth and ⅜ pint of a 30% aqueous solution of sodium nitrite are added.

This solution is applied to the fabric by spray stencilling, the stencilled and dried material being aged and developed as in Example 8.

I claim:

1. The process for the application of sulfuric ester salts of leuco vat dyestuffs to textiles, which comprises the addition to the ester salts of a compound of the general formula

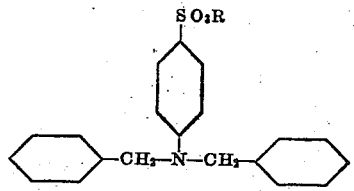

where R stands for an atom or radical conferring solubility in water, said compound being free of the corresponding salt of mono-benzyl-sulfanilic acid.

2. The process as claimed in claim 1 which comprises the application of the said compounds in solution in a polyhydric alcohol.

3. The process of coloring textile fiber which comprises applying thereto the sulfuric acid ester of a leuco vat dyestuff in the presence of a water-soluble salt of dibenzylsulfanilic acid substantially free of salts of mono-benzylsulfanilic acid, and diethylene-glycol.

4. The process of coloring textile fiber which comprises applying thereto the sulfuric acid ester of a leuco vat dyestuff in the presence of a water-soluble salt of dibenzylsulfanilic acid, the amount of the said salt being at least equal in weight to that of the leuco-ester.

ALEC WORMALD.